No. 711,451.  
W. C. DAVIS.  
WIRE ROPE TRAMWAY.  
(Application filed June 12, 1902.)  
Patented Oct. 14, 1902.

(No Model.)

WITNESSES:  
INVENTOR.  
W. C. Davis.  
BY  
ATTORNEY.

No. 711,451. Patented Oct. 14, 1902.
W. C. DAVIS.
WIRE ROPE TRAMWAY.
(Application filed June 12, 1902.)
(No Model.) 9 Sheets—Sheet 5.

No. 711,451. Patented Oct. 14, 1902.
W. C. DAVIS.
WIRE ROPE TRAMWAY.
(Application filed June 12, 1902.)
(No Model.) 9 Sheets—Sheet 6.

WITNESSES:
Otto E. Hoddick
Dena Nelson

INVENTOR.
W. C. Davis.
BY
ATTORNEY.

THE NORRIS PETERS CO., PHOTO-LITHO., WASHINGTON, D. C.

UNITED STATES PATENT OFFICE.

WILLIAM C. DAVIS, OF DENVER, COLORADO.

WIRE-ROPE TRAMWAY.

SPECIFICATION forming part of Letters Patent No. 711,451, dated October 14, 1902.

Application filed June 12, 1902. Serial No. 111,293. (No model.)

*To all whom it may concern:*

Be it known that I, WILLIAM C. DAVIS, a citizen of the United States of America, residing at Denver, in the county of Arapahoe and State of Colorado, have invented certain new and useful Improvements in Wire-Rope Tramways; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in overhead wire-rope tramways of the class employed in transporting ore in hilly and mountainous regions.

My improvement also relates to that class of tramways having two wire ropes or cables, one being stationary, held taut by suitable means and forming the track or support for the bucket-trolley, while the other is a moving endless rope or cable to which the trolley is connected by a suitable gripping device, whereby the bucket is carried over the line. Provision is made in my improvement for automatically releasing the traveling bucket from the hauling-rope at the terminals, the terminals being also equipped with tracks upon which the trolley runs in rounding the terminals.

In my improved system I also employ means for making turns at a considerable angle and also for passing particularly high as well as particularly low points.

The invention will now be described in detail, reference being made to the accompanying drawings, in which is illustrated an embodiment thereof.

In the drawings.

In Figs. 15 to 18, inclusive, the parts are considerably enlarged as compared with the other views.

The same reference characters indicate the same parts in all the figures.

Let the numeral 5 designate the stationary cables, and 6 the endless traveling cable for hauling the buckets. Each cable 5 is anchored fast at the upper terminal, as shown at 7, while its opposite extremity at the lower terminal is connected with the frame 8, carrying a weight 9 to give the cable the desired tension intermediate the terminals.

Let 10 designate the upper terminal framework or structure, and 12 the lower terminal frame. Each cable 5 engages brackets 13 and 14, fast on the frame 10, and engages guide-pulleys 15 and 16, mounted on the frame 12. Each cable 5 is further supported intermediate its terminals by suitable towers, as hereinafter more fully explained.

There are two cables 5, one on each side of the terminal frames and towers. The bucket-trolley travels over one of these cables while going in one direction and on the other when going in the opposite direction. The bucket-trolley leaves the cable 5 at the terminals and travels around the latter on curved tracks. The upper terminal track is designated 17 and the lower terminal track 18.

The traveling cable 6 passes around a horizontally-disposed wheel 19, journaled on a tension-carriage 20, whose wheels 21 engage and have a limited movement on parallel track-rails 22, mounted on the lower terminal frame. The wheel 19 has a grooved periphery to hold the cable in place thereon. Connected with the tension-carriage is a yoke 23, to which is attached one extremity of a cable 24, which passes over a guide-pulley 25. To the opposite extremity of this cable 24 is attached a frame 26, carrying weights 27 of sufficient gravity to give the traveling cable the desired or necessary tension. The traveling cable engages pulleys 28, mounted on the lower terminal frame. At the upper terminal the cable 6 passes around two vertically-disposed wheels 29 and a horizontally-disposed intermediate wheel 30, journaled in the frame 10. Each wheel 29 is provided with a flange or drum engaged by a hand-brake 31, whose extremities are connected with cranks 32 and 33, fast on a rock-shaft 34, controlled by a hand-lever 35. The wheel 30 is located in a plane tangential to the wheels 29. The two wheels 29 are independently journaled and turn in opposite directions.

The bucket 36 is trunnioned in depending arms 37, forming the bucket-bail. These arms are spaced by a bar 38 and bent inwardly, their upper extremities being suitably secured to a keeper 39, made fast to one extremity of a spindle 40, journaled in a bearing 41, centrally mounted on a trolley 42, in each extremity of which is journaled a wheel 43. These wheels engage the stationary cable 5.

Mounted on the trolley-frame 42 is an upwardly-projecting bracket composed of two separated arms 44, connected at the top by a part 45, fashioned to form a stationary jaw provided with a packing 46ª to facilitate the holding of the cable 6. Mounted on the lower part of the bracket and spanning the space between the two arms 44 is a pin 46, upon which is pivotally mounted one extremity of a pair of links 47. The opposite extremities of the links 47 are pivotally connected with shouldered trunnions 48, formed on a cross head or block 49, movably mounted in an open part 50 of a lever 51. This block 49 is provided with a threaded opening through which passes a screw 52, having a head 53, provided with openings to receive a pin, (not shown,) which may be used in turning the screw. The extremity of the screw 52 remote from the head bears against one extremity of the part 50. Hence the screw cannot move in that direction. Its opposite extremity is engaged by a set-screw 54, which prevents movement in the opposite direction. Hence as the screw 52 is turned the block 49 is moved in the one direction or the other, as desired. One extremity of the lever 51 is pivotally connected with a pin 55, which joins the arms 56 with a jaw 57, provided with a packing 58. This jaw 57 coöperates with the stationary jaw 45 to grip the endless hauling-cable 6. The pin 55 forms the fulcrum for the lever 51. The portion or extremity of this lever remote from the fulcrum is provided with a roller 59. When the parts of the grip are in the position shown in Fig. 18, the jaws are opened and the cable released.

In passing around the terminals of the line it is necessary that the bucket-trolley should be detached from the traveling cable for obvious reasons. For this purpose a trip 60 is mounted on each terminal frame and provided with an inclined part 60ª, lying in the path of the roller 59 of the grip as the bucket approaches the outwardly-curved portions of the tracks 17 and 18, respectively. Before reaching the trip the trolley has left the stationary cable in each instance and is riding on the track 17 or 18, as the case may be. As the trolley 60 engages the part 60ª of the trip the outer extremity of the lever 51 is raised sufficiently to throw the parts of the grip to the position shown in Fig. 18, whereby the bucket-trolley is detached from the cable and allowed to run around the terminal on the track 17 or 18. The entire movement of the lever 51 is not accomplished, however, directly by the inclined part of the trip. The direct action of the trip, however, continues until a straight line drawn through the centers of the pins 46 and 49 passes above the center of the pin 55, after which the movement of the lever will be automatic until the jaw 57 is moved sufficiently to release the cable. While the lever 51 is moving from the position shown in Fig. 17 to that shown in Fig. 18 the center of the pin 48 moves in an arc (designated A) struck from the center of the pin 46 and having a radius equal to the distance between the centers of the pins 46 and 48. If there was no movement of the arms 56 and the jaw 57 of the grip, the center of the pin 48 would move in an arc B, having a radius equal to the distance between the centers of the pins 48 and 55; but under the circumstances the center of the pin 55 must move a short distance in an arc C, struck from the center of the fulcrum-pin 57ª, in order to permit the operation of the lever 51. This movement of the pin 55 is sufficient to open the jaw 57 or throw it into the position shown in Fig. 18.

Figures 16, 17, 18:
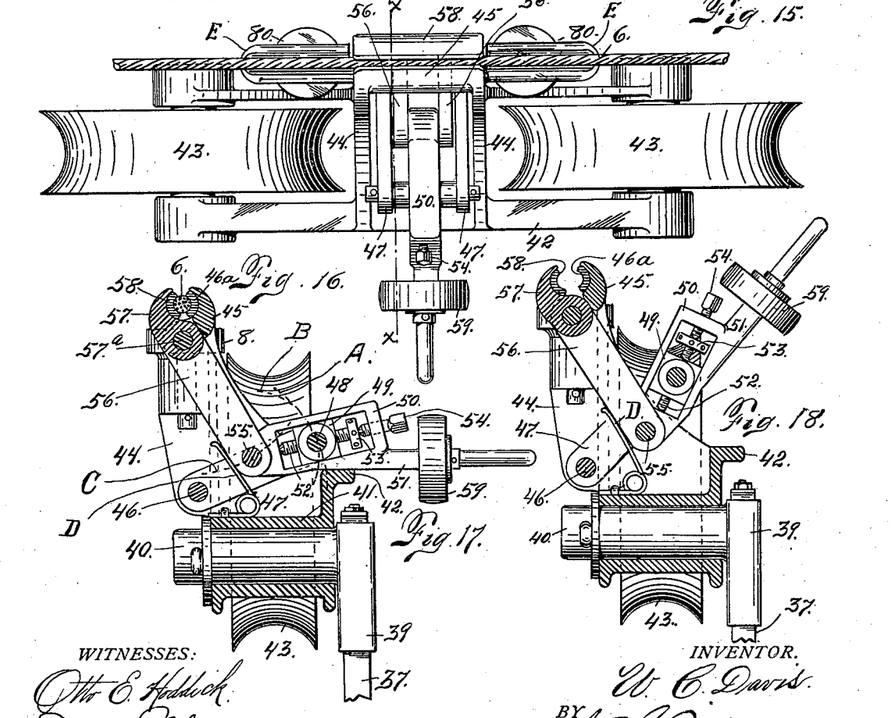
Fig. 17 is a section taken on the line $x\ x$, Fig. 16, the trolley being gripped to the hauling-cable and the bucket-spindle being in position in the trolley-frame.
Fig. 18 is a similar section showing the grip in the released position.

After the bucket has traveled around the terminal on the track 17 or 18, as the case may be, and reached a point on the other side opposite the trip 60 the cable 6 will pass between the open jaws of the grip, and the lever 51 may be thrown down by hand to the position shown in Fig. 17, whereby the bucket-trolley is again secured to the traveling cable for the return trip.

Figure 1:
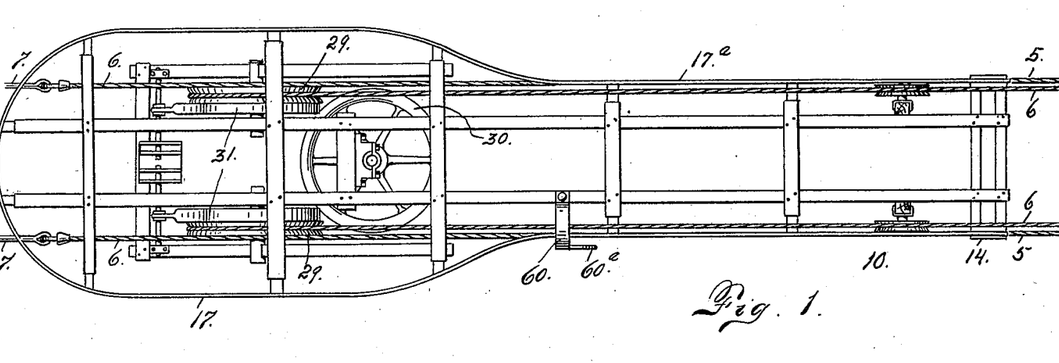
Figure 1 is a top or plan view of the upper terminal of the line.
Figure 2:
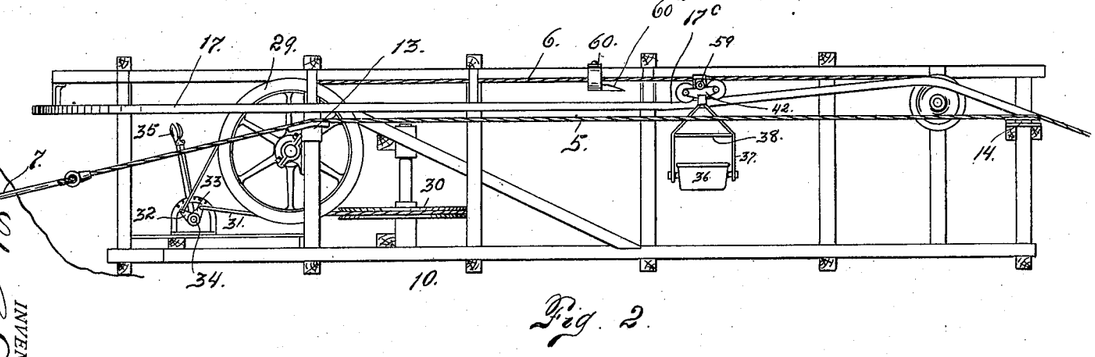
Fig. 2 is a side elevation of the same.
Figure 3:
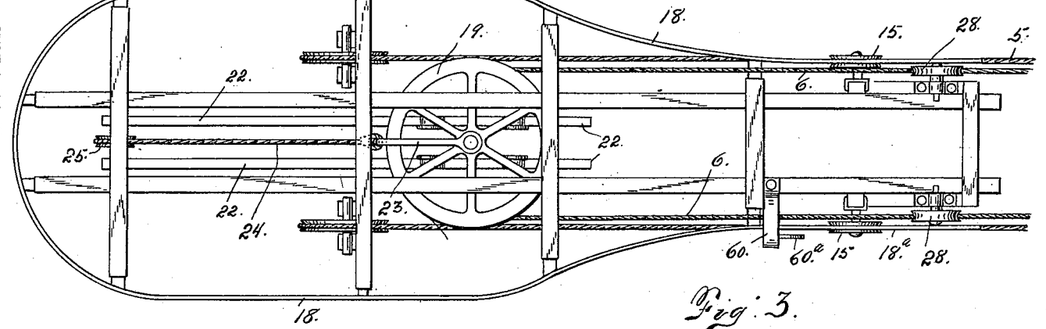
Fig. 3 is a plan view of the lower terminal.
Figure 4:
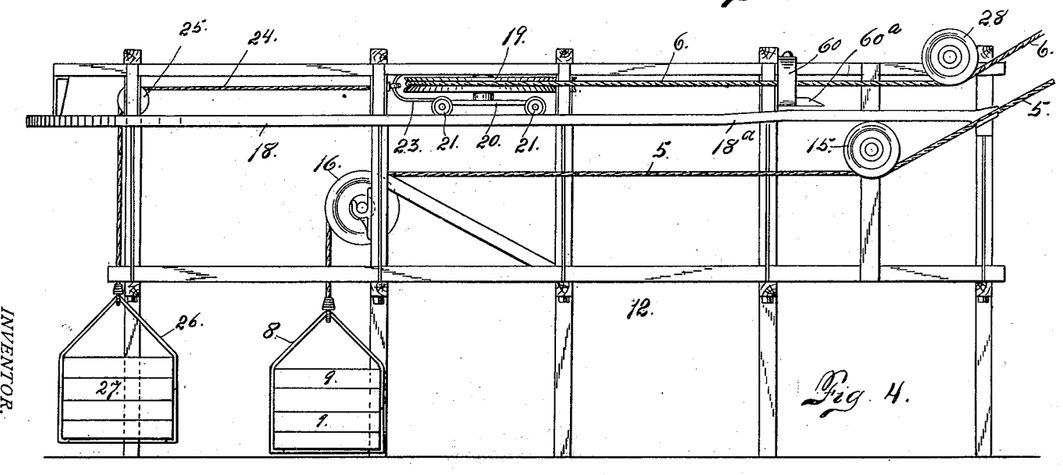
Fig. 4 is a side view of the same.
Figure 5:
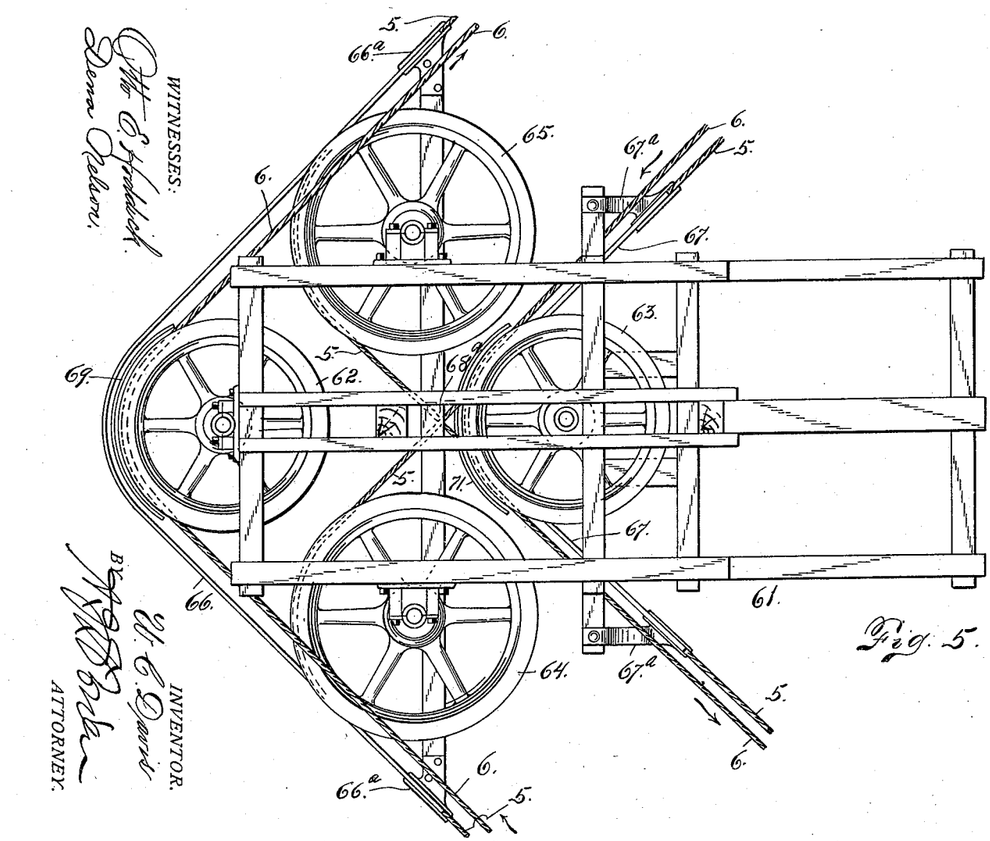
Fig. 5 is a plan view of the construction for changing the direction of the line by a right-angular turn.
Figure 6:
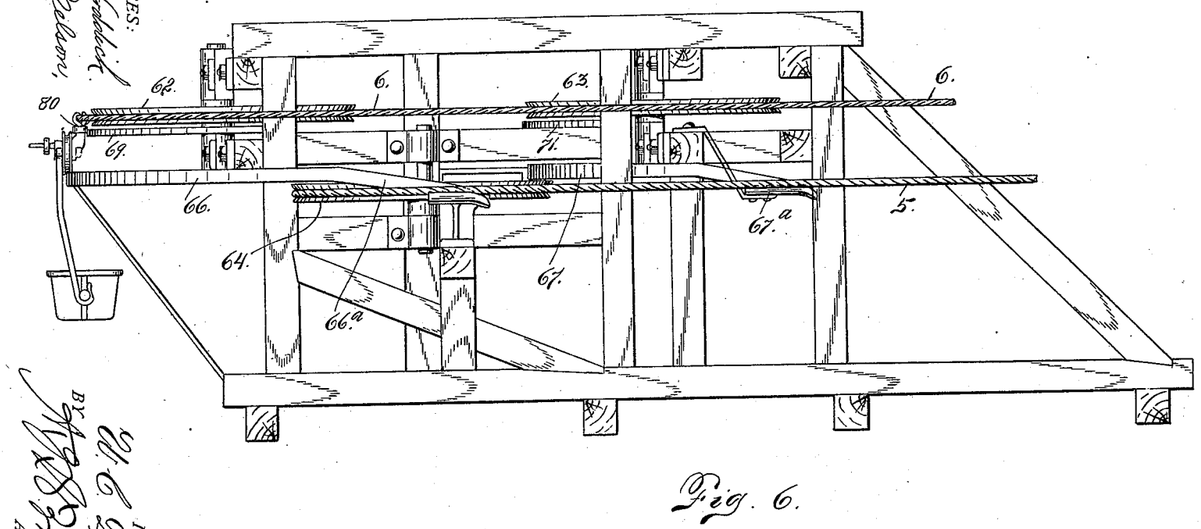
Fig. 6 is a side elevation of the same, showing the bucket in place.

When it is necessary to make a turn at a considerable angle, the construction shown in Figs. 5 and 6 may be employed, and the same will now be described. Upon a suitable tower or framework 61 are mounted four horizontal sheave-wheels, (designated) 62, 63, 64, and 65, respectively. The wheels 62 and 63 lie in one plane and the wheels 64 and 65 in a lower plane.

The wheel 62 is located at the exterior angle and the wheel 63 at the interior angle of the turn. The traveling cable 6 on one side of the line engages the wheel 62, while on the opposite side of the line it engages the wheel 63, the two wheels 63 and 62 being suitably spaced to correspond with the normal distance between the parts of the traveling cable on the opposite sides of the line. In other words, the cable 6 engages the wheel 62 when traveling in one direction and the wheel 63 when traveling in the opposite direction. There is a track 66 for the bucket-trolley, said track being located at the exterior angle of the turn for the bucket-trolley when traveling in one direction, while a track 67 is located at the interior angle of the turn, upon which the trolley rides when traveling in the opposite direction. These tracks are inclined at their extremities, as shown at 66ᵃ and 67ᵃ, respectively, to facilitate the movement of the trolley in passing from the cable to the track and back again from the track to the cable. A stationary cable 5 at one extremity of the track 66 passes below the track and thence around the adjacent sheave-wheel 64, whence it passes beneath the track 67 to the opposite side of the line, while the other cable 5, at the opposite extremity of the track 66, passes beneath the track and thence around the adjacent sheave-wheel 65 to the opposite side of the line. The two branches of the cable which engage the wheels 64 and 65, respectively, cross each other at 68ᵃ. (See Fig. 5.) Slightly below the wheel 62 and projecting beyond its periphery is a guard-rail 69, adapted to be engaged by two horizontally-disposed rollers 80, mounted on the trolley-frame and located on opposite sides of the grip. As the trolley is passed around the turn (illustrated in Figs. 5 and 6) the rollers 80 engage the rail 69 and cause the grip to hold the traveling cable away from the wheel 62. (See Fig. 6.) A similar rail 71 is located adjacent the wheel 63 and performs the same function when the trolley is rounding the turn in the opposite direction.

Figure 7:
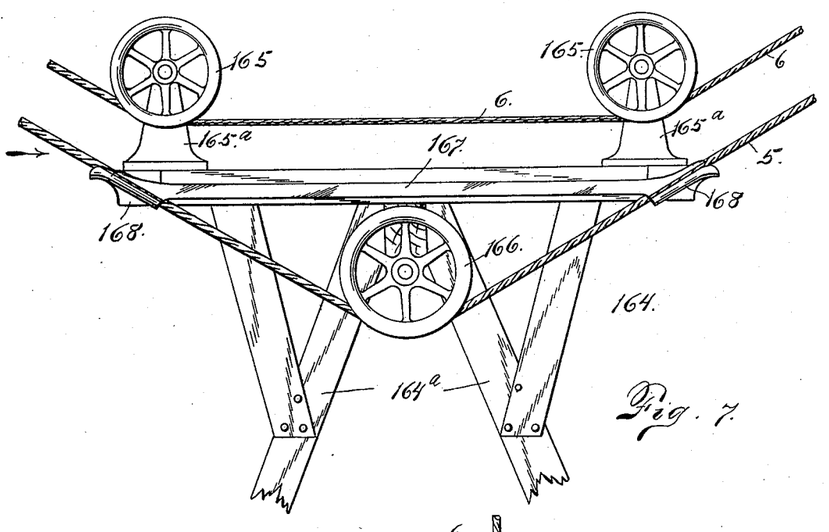
Fig. 7 is a side elevation of the construction for passing a particularly low point.
Figure 8:
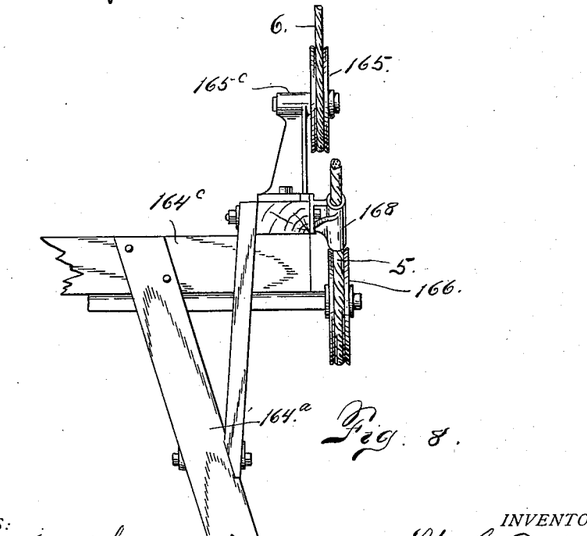
Fig. 8 is a front view of the same, or a view in the direction of the arrow in Fig. 7.

In passing a low point on the line a tower 164 of suitable structure is used. This tower comprises two side parts 164ᵃ, connected by a cross-beam 164ᶜ. (See Figs. 7 and 8.) On each of the two sides are located two sheave-wheels 165, underneath which the traveling cable passes. These wheels are journaled in cast standards or brackets 165ᵃ, made fast to the cross-beam. At the top of these standards are formed bearings 165ᶜ for the sheave-wheels' journals. Mounted also on this tower, but below the wheel 165 and in an outwardly-lying plane, is a sheave 166, positioned underneath the wheels 165. Above the wheel 66 and below the two wheels 165 is mounted a track-rail 167, at each extremity of which is formed a shoe 168, which engages the stationary cable from below and forms a support therefor. When the bucket-trolley reaches one of these shoes going in either direction, it leaves the cable and runs on the track 167 to the opposite shoe 168 and passes again to the cable 5 and continues its journey thereon. In the meantime the grip maintains its hold upon the traveling cable, passing underneath the sheaves 165. While passing a sheave the grip pulls the cable downwardly out of the groove of the wheel and below the periphery of the latter. This operation occurs on each side of the tower and is substantially the same whether the bucket and trolley are going in one direction or the other.

Figure 11:
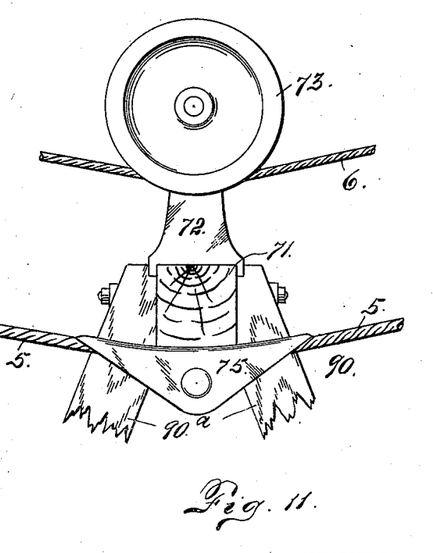
Figs. 11 and 12 are side and front views, respectively, of another form of construction for passing a low point.
Figure 12:
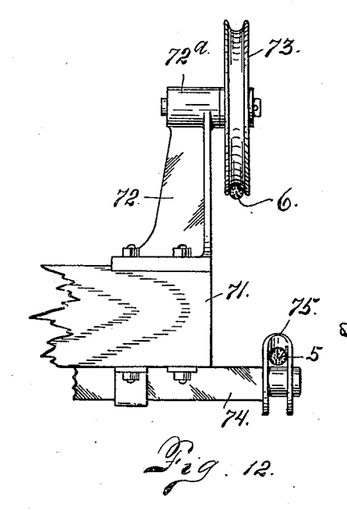
Figure 13:
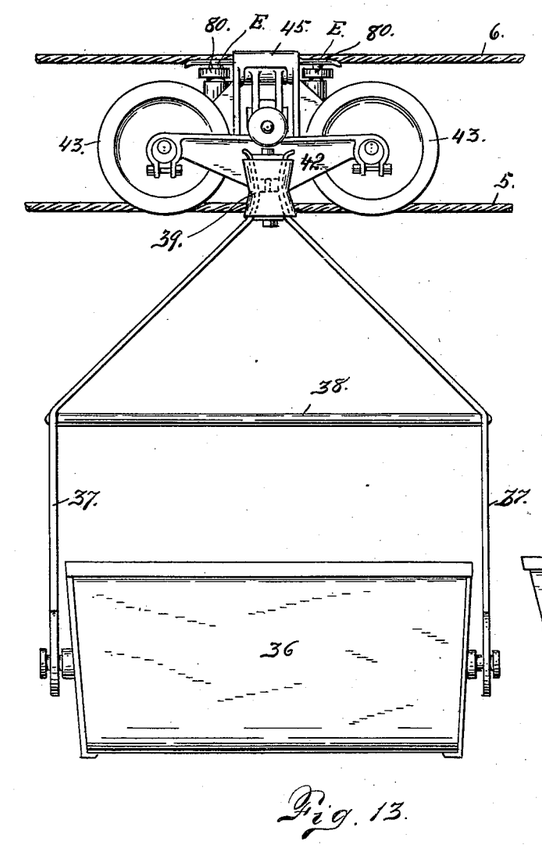
Figs. 13 and 14 are side and end views, respectively, of the bucket and trolley shown in the ordinary position on the cables between the supporting towers or structures.
Figure 14:
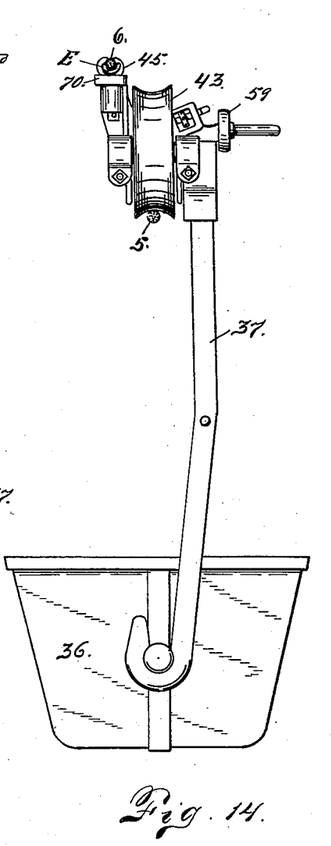
Figure 15:
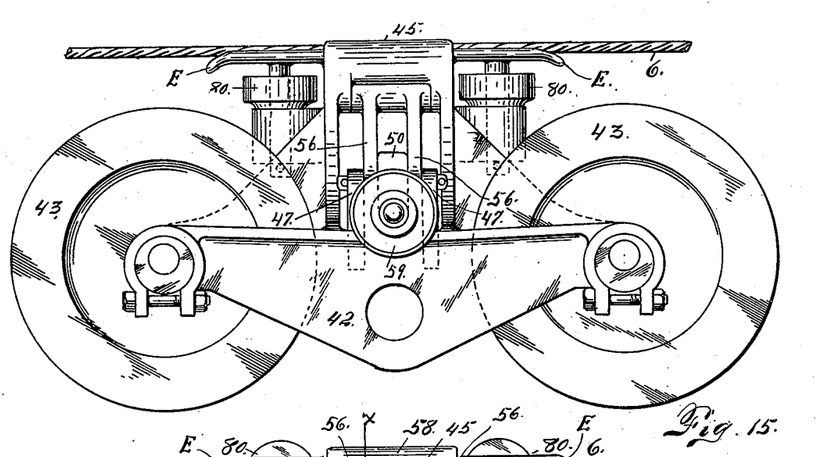
Figs. 15 and 16 are side and top views, respectively, of the bucket-trolley.

In Figs. 11 and 12 another form of construction for accomplishing the same purpose is shown. This consists of a suitable tower 90, composed of sides 90ᵃ, connected by a cross-beam 71. Mounted on each extremity of the cross-beam is a cast standard or bracket 72, having a bearing 72ᵃ at the top for the journal of a sheave-wheel 73, beneath which the traveling cable 6 passes. Bolted to each extremity of and below the cross-beam 71 is a bar 74, which projects outwardly beyond the plane of the wheel 73. To the other extremity of this bar is attached a saddle 75, which embraces the cable from above and holds the latter down in position to coöperate with the cable 6 above. When the bucket-trolley reaches this saddle, it leaves the cable, passes over the saddle, and again passes to the cable. In the meantime the grip pulls the trolley-cable down and passes under the sheave 73. The saddle is pivotally mounted and has a rocking movement.

Figure 9:
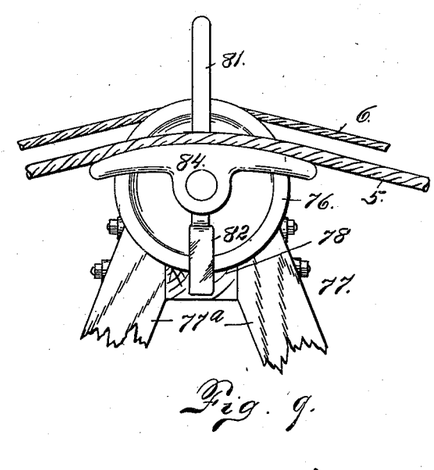
Fig. 9 is a side view of a construction for passing a high point.
Figure 10:
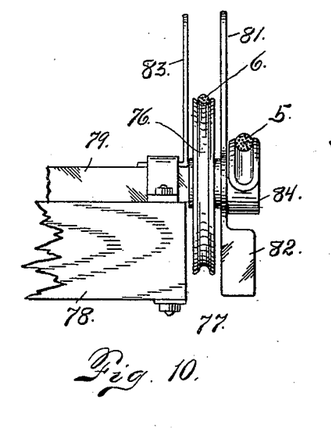
Fig. 10 is a front view of the same.

In Figs. 9 and 10 a construction is shown for passing over a high point on the line. In these views the sheave 76 is mounted on each side 77ᵃ of a tower 77, the two sides being connected by a cross-beam 78. To the top of this cross-beam on each side is secured a bar 79, which projects beyond the end of the beam. The wheel 76 is journaled on the protruding extremity of this bar. Pivotally mounted on the bar 79 outside of the wheel 76 is an arm 81, which projects upwardly above the wheel. This arm also projects below the bar and is weighted, as shown at 82, whereby the arm is normally held in an upright position. Rigidly mounted on the bar 79 on the opposite side of the wheel 76 is an upright arm 83. On the outer extremity of the bar 79 is pivotally mounted and made fast a saddle 84, which forms the support for the cable. In this case as the bucket and trolley approach the tower 77 the trolley passes upwardly on the cable 5 above the saddle. The cables 5 and 6 are normally located quite close together at this tower, the cable 6 being slightly above the cable 5. Hence while the trolley is passing over the cable 5 at this point the grip must raise the cable 6 above the wheel 76. The arms 81 and 83 form guides for the lifted cable to prevent it from getting out of position or out of the plane of the sheave. When the grip reaches the arm 81, which lies in its path, the latter yields, moving downwardly to allow the grip to pass, and as soon as the grip leaves the arm the latter returns automatically to its normal position by virtue of its weighted part 82.

Figure 19:
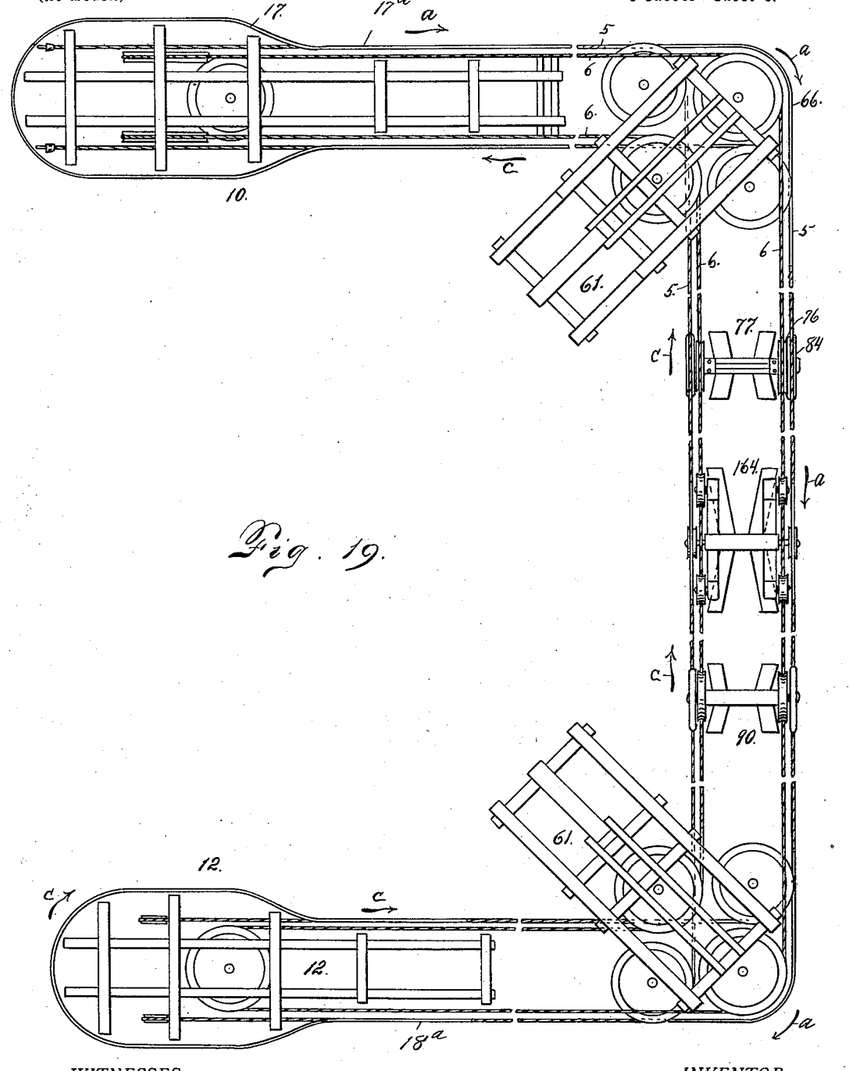
Fig. 19 is a plan view showing the various towers connectedly arranged to form a complete line with the cables in place, but on a smaller scale than in the other views.

From the foregoing description the use and operation of my improved tramway will be readily understood. This operation will, however, be briefly but connectedly described and is as follows: In this description special reference will be made to Fig. 19 of the drawings, which shows the general position and arrangement of the various parts constituting a tramway-line of this character, there being two right-angular turns in the line. Assuming that the buckets are loaded at the upper terminal 10, the loaded bucket is pushed from one side of the curved portion of the track-rail 17 out upon the portion $17^a$ thereof, where it is in position for the trolley-grip to grasp the traveling cable 6. The grip is at that time open, or in a position shown in Fig. 18 of the drawings. The lever 51 is then pulled down by hand to the position shown in Fig. 17, causing the grip to grasp the traveling cable, as heretofore explained. This cable then carries the bucket-trolley from the portion $17^a$ of the track out upon the other cable 5 and thence in the direction of the arrow $a$ in Fig. 19 to the tower 61 for making a right-angular turn, when the trolley leaves the cable 5 and passes to the track-rail 66, upon which it remains until the turn is completed, when it again passes to the stationary cable. In the meantime the rollers 80, mounted on the trolley-frame, engage the guard-rail 69 and cause the grip to pull the traveling cable out from the periphery of the wheel 62. (See Fig. 6.) Still referring to Fig. 19, the bucket-trolley after leaving the tower 61 passes over the tower 77, while the trolley-grip lifts the cable 6 from the wheel 76. After the trolley passes over this tower the cable 6 returns to its normal position upon the sheave. The trolley then passes to a tower 164, where the trolley leaves the cable 5 and passes over the track-rail 167 (see Fig. 7) and again returns to the cable 6 on the opposite side of the tower. Next in order, according to Fig. 19, the trolley passes a tower 90 and then passes to another tower 61, where it makes another right-angular turn in the manner already described, and passes thence to the lower terminal 12, where the trolley leaves the cable 5 and passes to the portion $18^a$ of the track-rail 18, where the roller 59 engages the inclined part $60^a$ of the trip, whereby the grip is thrown to the position shown in Fig. 18, releasing the cable. The loaded bucket is then dumped through the instrumentality of any suitable mechanism, none being shown in the drawings. The trolley after passing around the lower terminal begins the return trip on the opposite side of the line. The arrow $c$ now indicates the direction of travel, and the operation at the turns and towers is substantially the same as heretofore described when following the trolley on the opposite side of the line. At the turns the trolley follows the track-rails 66 and 67 and the grip passes around the sheaves 62 and 63 in the manner heretofore described.

At the lower terminal 12 there is a downward bend in the track-rail 18 as shown at $18^a$, located just beyond the trip 60, to allow the grip to move downwardly away from the cable 6 after its jaws have been opened, as heretofore explained. At the upper terminal 12 there is also a downward bend, as shown at $17^c$, for the same purpose. The bend, however, is located forward of the trip and is sufficient in degree to cause the grip to pull the cable 6 downwardly below its normal plane, so that as soon as the jaws of the grip are opened the cable will move upwardly above the said jaws.

By virtue of the location of the parts of the grip as shown in Fig. 17 the latter is positively locked, since the lever 51 rests upon the trolley-frame 42, whereby it is prevented from moving farther downwardly, and the tendency of the pin 55 is to move toward the right in the arc C, since the action of the cable on the jaw 57 would have a tendency to move the jaw in the opposite direction or toward the left.

To increase the opening movement of the jaw 57 after the trip 60 has performed its function, a spring D may be employed. This spring, as shown in the drawings, is mounted on the trolley-frame and bears against the bifurcated portion of the movable jaw below the pivot $57^a$.

The stationary jaw is provided with two saddle parts E, projecting therefrom in opposite directions and forming a support for the traveling cable 6.

Having thus described my invention, what I claim is—

1. In a wire-rope tramway system, the combination of a stationary cable and an endless traveling cable mounted above the stationary cable, a trolley mounted on the stationary cable, a bucket carried by the trolley, and a grip mounted on the trolley-frame and composed of a stationary jaw, a movable jaw fulcrumed on the frame and having an arm projecting below the fulcrum, a lever fulcrumed on the jaw-arm remote from the jaw proper, a link pivoted on the trolley-frame at one extremity and on the lever at the opposite extremity at a point beyond the connection of the jaw-arm with the lever, a roller mounted on the lever beyond its connection with the link, and a trip suitably mounted in the path of said roller for releasing the grip.

2. In an overhead wire-rope tramway system, the combination with a stationary cable, of a trolley mounted on the stationary cable, a grip carried by the trolley and comprising a lever projecting beyond the plane of the stationary cable, a block adjustably mounted on the lever, a link pivoted on the trolley-frame at one extremity and on the adjust- 20. In a wire-rope tramway system, the combination with stationary and traveling cables, of a tower located at a relatively high point and provided with a sheave for the traveling cable and a rocking saddle for the stationary cable, a bucket-carrying trolley, a grip mounted on the trolley to engage the traveling cable, the arrangement of the saddle and sheave being such that the traveling cable must be raised from the sheave in order to pass the tower, guides mounted on the tower to keep the traveling cable in the plane of the sheave when the cable is raised therefrom, one of the guides being stationary and the other movable, whereby it turns out of the way to permit the grip to pass without obstruction.

21. In an overhead wire-rope tramway system, the combination with the stationary and traveling cables, of a tower located at a relatively high point and provided with a sheave over which the traveling cable passes, and a saddle over which the stationary cable passes, a bucket-carrying trolley, a grip mounted on the trolley to engage the traveling cable, the arrangement being such that the traveling cable must be raised from the sheave in order to pass the tower, and two guide-arms mounted on the tower on opposite sides of the sheave, one of said arms being movable to permit the grip to pass.

22. In an overhead wire-rope tramway system, the combination with the stationary and traveling cables, of a tower located at a relatively high point and provided with a sheave over which the traveling cable passes, and a saddle over which the stationary cable passes, a bucket-carrying trolley, a grip mounted on the trolley to engage the traveling cable, the arrangement being such that the traveling cable must be raised from the sheave in order to pass the tower, and two guide-arms mounted on the tower on opposite sides of the sheave, one of said arms being movable to permit the grip to pass, the movable arm being weighted to return it to its normal position after the trolley has passed over the tower.

23. In an overhead wire-rope tramway, the combination with the stationary and traveling cables, of a tower located at a relatively low point, a sheave mounted on the upper part of the tower, beneath which sheave the traveling cable passes, and means mounted on the tower below the sheave for holding the stationary cable down in its proper position, substantially as described.

24. The combination with the stationary and traveling cables, and a bucket-carrying trolley, of a tower located at a relatively low point, and having two sheaves above for the traveling cable, a sheave below for the stationary cable, and an intermediate track-rail whose extremities are connected with the stationary cable, upon which track the trolley runs, and a grip mounted on the trolley for grasping the traveling cable.

In testimony whereof I affix my signature in presence of two witnesses.

WILLIAM C. DAVIS.

Witnesses:
DENA NELSON,
A. J. O'BRIEN.